United States Patent
Vadapandeshwara et al.

(10) Patent No.: US 12,169,683 B2
(45) Date of Patent: Dec. 17, 2024

(54) AUTOMATIC TWO-WAY GENERATION AND SYNCHRONIZATION OF NOTEBOOK AND PIPELINE

(71) Applicant: ORACLE FINANCIAL SERVICES SOFTWARE LIMITED, Mumbai (IN)

(72) Inventors: Rajaram N. Vadapandeshwara, Bangalore (IN); Tara Kant, Bangalore (IN); Farsana K, Kerala (IN)

(73) Assignee: Oracle Financial Services Software Limited, Mumbai (IN)

( * ) Notice: Subject to any disclaimer, the term of this patent is extended or adjusted under 35 U.S.C. 154(b) by 0 days.

(21) Appl. No.: 17/570,435

(22) Filed: Jan. 7, 2022

(65) Prior Publication Data
US 2023/0161945 A1     May 25, 2023

(30) Foreign Application Priority Data
Nov. 19, 2021  (IN) .............................. 202121053246

(51) Int. Cl.
*G06F 40/12* (2020.01)
*G06F 8/33* (2018.01)
(Continued)

(52) U.S. Cl.
CPC ................ *G06F 40/12* (2020.01); *G06F 8/33* (2013.01); *G06F 8/433* (2013.01); *G06F 9/451* (2018.02); *G06F 40/103* (2020.01); *G06F 40/166* (2020.01)

(58) Field of Classification Search
CPC ........ G06F 40/12; G06F 9/451; G06F 40/103; G06F 40/166; G06F 8/33; G06F 8/433
(Continued)

(56) References Cited

U.S. PATENT DOCUMENTS

| 8,856,126 B2 | 10/2014 | Nagulakonda et al. |
| 9,372,917 B1 * | 6/2016 | Saylor ................... G06F 16/334 |

(Continued)

OTHER PUBLICATIONS

Oracle Financial Services; Oracle Financial Services Model Management and Governance / Data Sheet / Version 1.0; Copyright 2020, pp. 1-6.
(Continued)

*Primary Examiner* — Stephen S Hong
*Assistant Examiner* — Tionna M Burke
(74) *Attorney, Agent, or Firm* — Kraguljac Law Group, LLC

(57) ABSTRACT

Systems, methods, and other embodiments associated with associated with automatic two-way generation and synchronization of notebook and pipeline are described. In one embodiment, a computer-implemented method includes: identifying a difference between pipeline and notebook representations of application logic, wherein the difference is one of (i) a notebook paragraph without a corresponding pipeline node and (ii) a pipeline node without a corresponding notebook paragraph; synchronizing the pipeline representation and notebook representation by, for the notebook paragraph that does not have a corresponding pipeline node, automatically generating a new pipeline node in the pipeline representation, and for the pipeline node that does not have a corresponding notebook paragraph, automatically generating a new notebook paragraph in the notebook representation; and updating either a pipeline user interface to show the new pipeline node or a notebook user interface to show the new notebook paragraph.

20 Claims, 7 Drawing Sheets

(51) Int. Cl.
*G06F 8/41* (2018.01)
*G06F 9/451* (2018.01)
*G06F 40/103* (2020.01)
*G06F 40/166* (2020.01)

(58) Field of Classification Search
USPC .......................................................... 715/234
See application file for complete search history.

(56) References Cited

U.S. PATENT DOCUMENTS

| | | |
|---|---|---|
| 9,507,567 B2 | 11/2016 | Vadapandeshwara et al. |
| 9,684,490 B2 | 6/2017 | Vadapandeshwara et al. |
| 10,042,956 B2 | 8/2018 | Vadapandeshwara et al. |
| 10,152,318 B2 | 12/2018 | Vadapandeshwara et al. |
| 10,534,636 B2 | 1/2020 | Vadapandeshwara et al. |
| 10,645,090 B2 | 5/2020 | Vadapandeshwara et al. |
| 10,969,929 B2 | 4/2021 | Vadapandeshwara et al. |
| 11,042,929 B2 | 6/2021 | Nagulakonda et al. |
| 11,068,306 B2 | 7/2021 | Vadapandeshwara et al. |
| 2004/0002818 A1 | 1/2004 | Kulp et al. |
| 2016/0379120 A1 | 12/2016 | Merdivan et al. |
| 2021/0034980 A1 | 2/2021 | Xia et al. |
| 2021/0055972 A1 | 2/2021 | Vadapandeshwara et al. |
| 2021/0150411 A1 | 5/2021 | Coenders et al. |
| 2021/0326717 A1* | 10/2021 | Mueller ................. G06N 20/00 |
| 2021/0342725 A1* | 11/2021 | Marsden .............. G06K 9/6256 |
| 2022/0004897 A1 | 1/2022 | Jadon et al. |
| 2022/0124543 A1 | 4/2022 | Orhan et al. |
| 2022/0308737 A1* | 9/2022 | Chakraborty .......... G06N 20/00 |
| 2023/0014465 A1 | 1/2023 | Sheng et al. |
| 2023/0033886 A1 | 2/2023 | Goswami et al. |

OTHER PUBLICATIONS

Oracle Financial Services; Oracle Financial Services Model Management and Governance / User Guide / Release 8.1.0.0.0—Feb. 2021; pp. 1-75.

United States Patent and Trademark Office, Final Office Action issued in U.S. Appl. No. 17/577,497 having a Date of Mailing of Feb. 8, 2024 (30 pgs).

United States Patent and Trademark Office, "Notice of Allowance", issued in U.S. Appl. No. 17/577,497 having a Date of Mailing of Jun. 12, 2024 (9 pgs).

United States Patent and Trademark Office, Non-Final Office Action issued in U.S. Appl. No. 17/577,497 having a Date of Mailing of Oct. 12, 2023 (30 pgs).

JP5818351 (translation), Nov. 18, 2015, 21 pgs., JP_5818351.pdf.

* cited by examiner

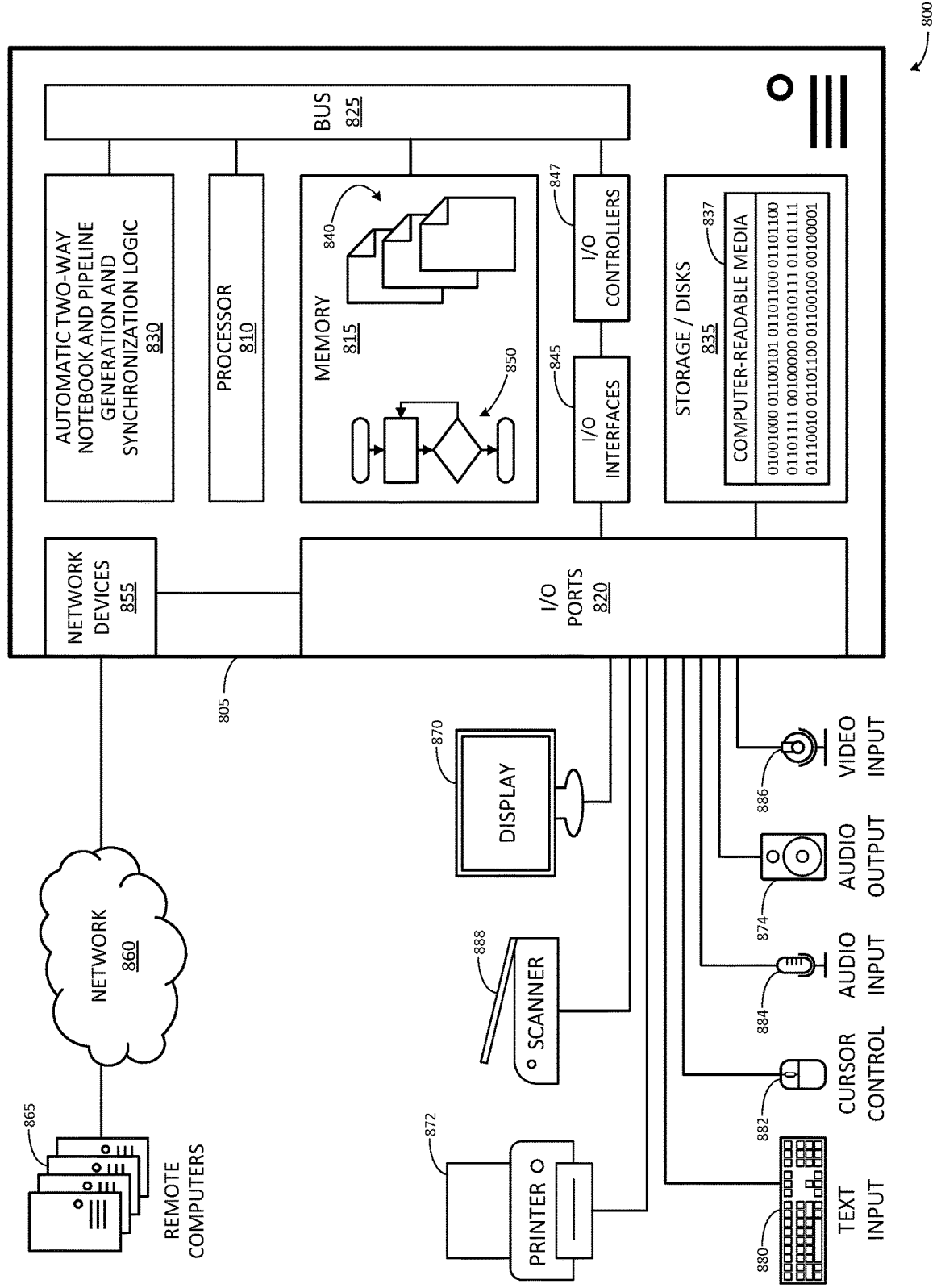

AUTOMATIC TWO-WAY GENERATION AND SYNCHRONIZATION OF NOTEBOOK AND PIPELINE

CROSS REFERENCE TO RELATED APPLICATIONS

This disclosure claims the benefit of India Provisional Patent Application serial number 202121053246 filed Nov. 19, 2021, titled "Automatic Two-Way Generation and Synchronization of Notebook and Pipeline", having inventors Rajaram N. Vadapandeshwara, Tara Kant, and Farsana K, and assigned to the present assignee, which is incorporated by reference herein in its entirety.

BACKGROUND

Notebook interfaces or computational notebooks such as Oracle® Data Studio, Jupyter, Zeppelin, Google Notebook Service, and SageMaker Notebook allow data-scientists and modelers to script statistical and machine learning (ML) models that serve predictive use-cases. Increasingly, notebook interfaces are also used to script deterministic compute.

With the spread of notebooks, business domain users are becoming disconnected from the underlying business logic scripted in notebooks. The resulting loss of auditability, explain-ability and ease of regulatory oversight due to use of notebooks for development are reasons that statistical and ML analyses, although becoming mainstream, remain on the fringes of regulatory approval.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 8 illustrates an embodiment of a computing system configured with the example systems and/or methods disclosed.

DETAILED DESCRIPTION

Figure 1:
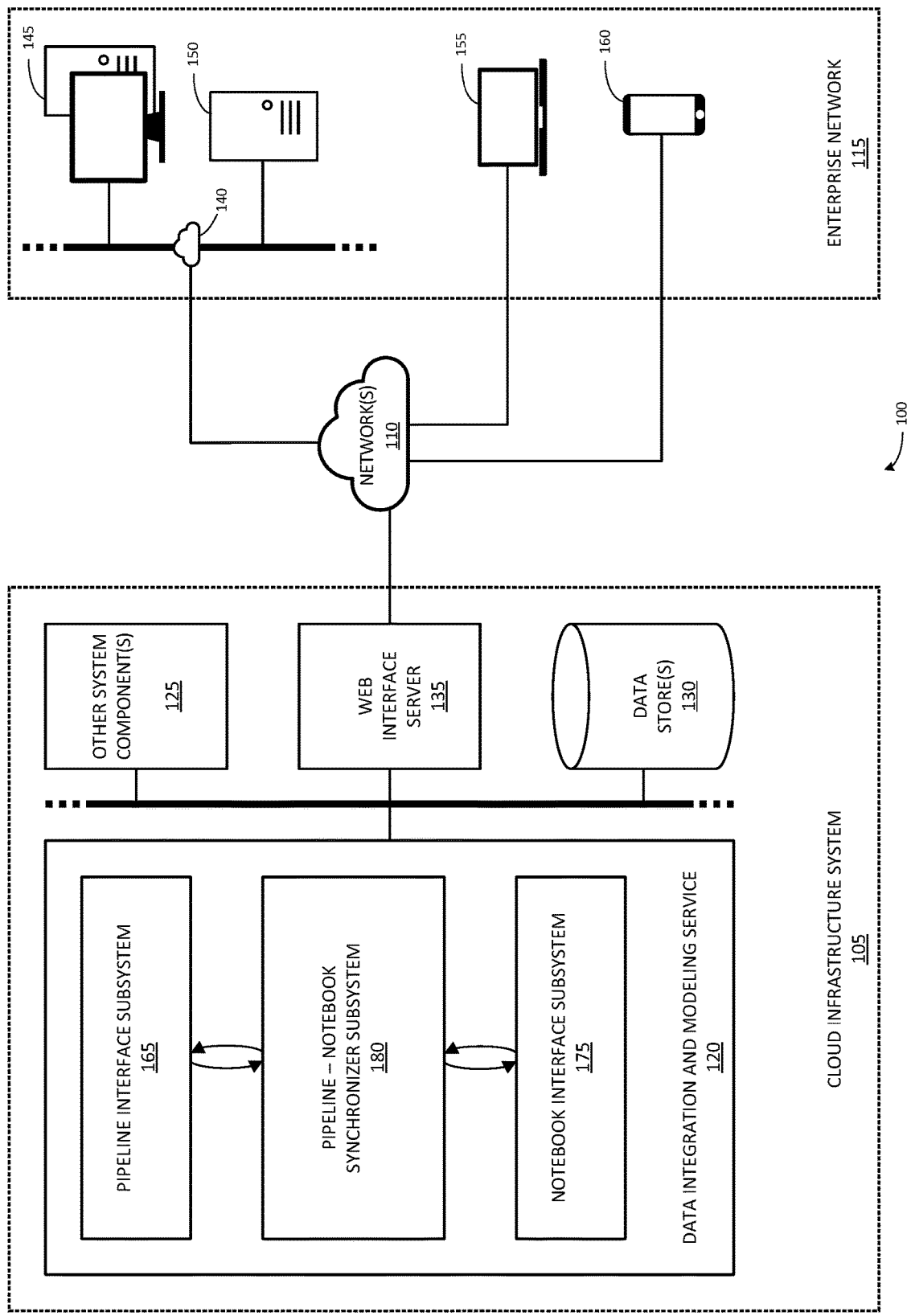
FIG. 1 illustrates one embodiment of a system associated with automatic two-way generation and synchronization of notebook and pipeline.

The challenges to uses of computer modeling (both statistical and ML) are numerous. Regulators do not readily accept outcomes, decisions, numbers, filings that have been derived using modeling (including ML modeling) or data-science algorithms due at least in part to lack of transparency of notebooks to a business/domain user. Business/domain users typically have no way to validate, verify, and own application logic that include models or data-science drivers. The disconnect between the preferred interface of business/domain users—pipeline—and the preferred interface of data scientist users—notebook, makes a collaborative 'configuration' approach between business/domain users and data-scientists/modelers to augmenting rule-based compute solutions with model-based logic practically impossible. There is no interchangeable paradigm that supports visual design process (as in a pipeline interface) and scripting process (as in a notebook interface).

The systems, methods, and other embodiments for automatic two-way generation and synchronization of notebook and pipeline described herein overcome these and other challenges. Systems, methods, and other embodiments are described herein that provide automatic generation and synchronization of notebook with pipeline, and of pipeline with notebook. In particular, the systems, methods, and other embodiments allow for: (i) automatic generation or modification of business flow pipeline in response to user-input changes to notebook code; and (ii) automatic generation or modification of notebook code in response to user-input changes to the pipeline. Statistical and ML operations developed in notebooks can be presented to business-domain users as objects in a pipeline view readily understood by business users, and changes to the pipeline cause the notebook code to be augmented (code-generated) automatically in conjunction with the user's edits to the pipeline. The systems, methods, and other embodiments also allow the business users and domain specialists to design the business logic declaratively and the notebook code is automatically generated behind the scenes. This enables data-scientists to collaboratively work with domain analysts to fine tune business-logic/process-flow end-to-end. Any change done by business/domain analysts in pipeline view or by modelers/data-scientists in notebook view is immediately visible to the other using the other view. The pipeline flow and notebook thus do not go out of synchronization with each other. Thus, in one embodiment, automatic two-way generation and synchronization of notebook and pipeline as described herein provides a low-code/no-code data science platform.

In one early test of embodiment of automatic two-way generation and synchronization of notebook and pipeline, the generation and synchronization capability proved to be highly effective. A test system successfully converted over 10,000 lines of notebook code to a pipeline flow with every paragraph mapping to a corresponding task in the pipeline as a named object and the notebook-paragraph code as the embedded business logic in the task callable as a REST API. Thus, what was difficult to decipher as a deluge of code in a notebook became a visually auditable pipeline and the end-to-end process was debug-able, interactively monitorable, and explainable with regard to regulatory oversight.

No action or function described or claimed herein is performed by the human mind. An interpretation that any action or function can be performed in the human mind is inconsistent with and contrary to this disclosure.

—Example Environment—

FIG. 1 illustrates one embodiment of a system 100 associated with automatic two-way generation and synchronization of notebook and pipeline. In one embodiment, system 100 includes a cloud infrastructure system 105 such as Oracle® Cloud Infrastructure connected by the Internet 110 (or another suitable communications network or combination of networks) to an enterprise network 115.

In one embodiment, cloud infrastructure system 105 includes various systems and components which include data integration and modeling service 120, other system components 125, data store(s) 130, and web interface server 135.

In one embodiment, data integration and modeling service 120 may include components of Oracle Financial Services' Model Management and Governance (MMG) tool for developing, deploying, and managing statistical, machine learning, computational, and simulation models. In one embodiment, other system components 125 may include cloud services that may be combined by data integration and modeling service 120 to build and run special purpose computing applications, such as statistical, machine learning, computational, and simulation models. In one embodiment, other system components 125 may further include user administration modules for governing the access of users to cloud infrastructure system 105.

Each of the components of cloud infrastructure system 105 is configured by logic to execute the functions that the component is described as performing. In one embodiment, the components of cloud infrastructure system may be implemented as sets of one or more software modules executed by one or more computing devices specially configured for such execution. In one embodiment, the components of cloud infrastructure system 105 are implemented on one or more hardware computing devices or hosts interconnected by a data network. For example, the components of cloud infrastructure system 105 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of cloud infrastructure system 105 are implemented by dedicated computing devices. In one embodiment, the components of cloud infrastructure system 105 are implemented by a common (or shared) computing device, even though represented as discrete units in FIG. 1. In one embodiment, cloud infrastructure system 105 may be hosted by a dedicated third party, for example in an infrastructure-as-a-service (IAAS), platform-as-a-service (PAAS), or software-as-a-service (SAAS) architecture.

In one embodiment, the components of system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of system 100 may (i) generate or compose an electronic message or signal to issue a command or request to another component, (ii) transmit the message or signal to other components of computing system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems (such as those of enterprise network 115) may access information or applications provided by cloud infrastructure system 105 through web interface server 135. In one embodiment, the remote computing system may send requests to and receive responses from web interface server 135. In one example, access to the information or applications may be effected through use of a web browser on a personal computer 145, remote user computers 155 or mobile device 160. For example, these computing devices 145, 155, 160 of the enterprise network 115 may access a notebook graphical user interface (GUI) (also referred to as a data studio) or a pipeline GUI (also referred to as a canvas) for developing application logic. In one example, communications may be exchanged between web interface server 135 and personal computer 145, server 150, remote user computers 155 or mobile device 160, and may take the form of remote representational state transfer (REST) requests using JavaScript object notation (JSON) as the data interchange format for example, or simple object access protocol (SOAP) requests to and from XML servers. The REST or SOAP requests may include API calls to components of cloud infrastructure system 105. For example, computers 145, 150, 155 of the enterprise network 115 may request creation or deletion of a notebook paragraph through the notebook interface, or creation of deletion of a pipeline node through the pipeline interface.

Enterprise network 115 may be associated with a business. For simplicity and clarity of explanation, enterprise network 115 is represented by an on-site local area network 140 to which one or more personal computers 145, or servers 150 are operably connected, along with one or more remote user computers 155 or mobile devices 160 that are connected to enterprise network 115 through network(s) 110. Each personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connect to local area network 140 or network(s) 110 through wireless networks, such as cellular telephone networks or Wi-Fi. Users of the enterprise network 115 interface with cloud infrastructure system 105 across network(s) 110.

In one embodiment, data store 130 is a computing stack for the structured storage and retrieval of one or more collections of information or data in non-transitory computer-readable media, for example as one or more data structures. In one embodiment, data store 130 includes one or more databases configured to store and serve information used by cloud infrastructure system 105. In one embodiment, data store 130 includes one or more notebook databases configured to store and serve computational notebooks, for example as data structures in the Jupyter format. In one embodiment, data store 130 includes one or more pipeline databases configured to store and serve information defining ordered execution of discrete tasks, for example as a graph data structure of metadata describing the tasks as nodes and the order as links of the graph. In one embodiment, data store 130 includes one or more Oracle® databases configured to store and serve the notebooks and pipeline data structures. In some example configurations, data store(s) 130 may be implemented using one or more Oracle® Exadata compute shapes, network-attached storage (NAS) devices and/or other dedicated server device.

In one embodiment, data integration and modeling service is the Model Management and Governance application offered by Oracle Financial Services. In one embodiment, data integration and modeling service 120 include one or more components configured for implementing methods, functions, and other embodiments described herein associated with automatic two-way generation and synchronization of notebook and pipeline. In one embodiment, data integration and modeling service 120 is configured with logic (such as Automatic Two-Way Notebook and Pipeline Generation and Synchronization Logic 830 shown and described with reference to FIG. 8) to implement methods, functions, and other embodiments described herein. For example, data integration and modeling service 120 may include pipeline interface subsystem 165, notebook interface subsystem 175, and pipeline-notebook synchronizer subsystem 180. In one embodiment, pipeline interface subsystem 165 maintains one or more pipelines representing application logic as a set of task nodes linked in an order of execution, executes the pipelines (or pipeline segments), and presents the pipelines for user review and editing through a canvas-style graphical user interface, as shown and described in further detail herein. In one embodiment, notebook interface subsystem maintains one or more notebooks representing application logic as a set of notebook paragraphs including executable code or script, executes the notebooks (or individual notebook paragraphs), and presents the notebooks for user review and editing through a notebook-style graphical user interface. In one embodiment, pipeline-notebook synchronizer subsystem 180 causes changes made to notebook representation of application logic to be presented in a pipeline representation of the application logic, and causes changes mad to pipeline representation of the application logic to be presented in the notebook representation of the application logic, ensuring automatic, real time, two-way synchronization between the notebook and pipeline representations.

—Notebook and Pipeline Interfaces to Application Logic—

Figure 2:
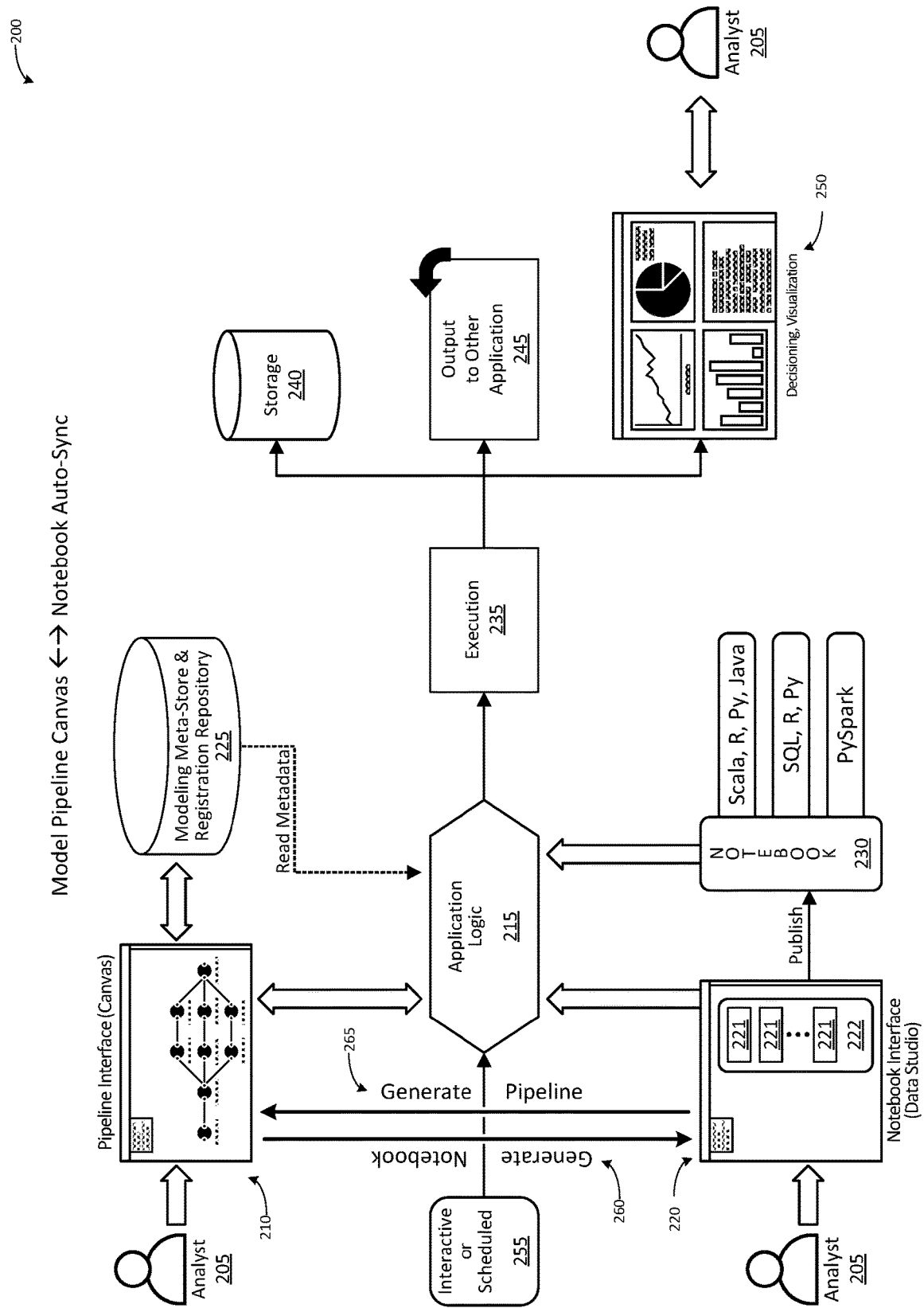
FIG. 2 illustrates a concept diagram of one embodiment of notebook and pipeline interfaces in relation to application logic associated with automatic two-way generation and synchronization of notebook and pipeline.

FIG. 2 illustrates a concept diagram 200 of one embodiment of notebook and pipeline interfaces in relation to application logic associated with automatic two-way generation and synchronization of notebook and pipeline. In one embodiment, there are two interfaces for viewing and editing application logic available to an analyst (or user) 205, depending on the preference of the analyst 205.

One interface, the pipeline interface 210 (also referred to as a canvas), is directed towards an analyst 205 who is a business analyst or domain analyst (that is, a specialist in a field of endeavor), and provides a visual pipeline representation of underlying application logic 215. In one embodiment, the pipeline representation shows an application as a directed graph, with nodes that represent granular tasks or functions connected by links that indicate inputs and outputs of the task nodes. This visual pipeline representation may hide many of the operational details of the tasks in order to provide a visually uncluttered representation of the application logic, and may enable the underlying operational details to be viewed and edited by selection of the nodes and links. The pipeline interface 210 thus provides a low-code (or no-code) data sciences platform. The pipeline interface 210 is presented primarily for a non-technical analyst, so the analyst can look at each object, and see visually that it is for a particular type of data process such as data ingestion, data profiling, etc.

Another interface, the notebook interface 220 (also referred to as a data studio or rules or models authoring interface), is directed towards an analyst 205 who is a data scientist or modeler, and provides a computational notebook representation of underlying application logic 215. In one embodiment, the notebook representation shows an application as a series of paragraphs 221, also referred to as cells, in a draft notebook 222. The paragraphs 221 represent granular tasks or functions written in computer-executable code or script. The notebook representation displays the executable code of a task (also referred to herein as a functional script) in order to provide a complete representation of the application logic, and permitting direct editing. In one embodiment, additional types of paragraphs may also be included in a notebook in addition to executable code paragraphs, such as results, formatting, graphics, or non-executable text paragraphs, providing an interactive environment that presents code, results, visualization, and documentation in a unified document.

In one embodiment, notebook interface 220 includes a kernel for execution of code in paragraphs. Code in notebook paragraphs may be written in a variety of interpreted languages. A notebook may be multi-lingual, with paragraphs written in differing languages. The kernel includes interpreters for these languages. For example, the languages may include Java, Scala, R, Python, PySpark, JavaScript, structured query language (SQL), and property graph query language (PGQL). The kernel may also include interpreters for application-specific content, such as an interpreter for Oracle Financial Services Analytical Applications (OFSAA) commands. In the paragraph, the code begins with a call to a magic function—a magic function is a pre-defined function in the kernel that executes supplied commands—that selects an interpreter for the code. For example, an "% ofsaa" magic at the beginning of a paragraph indicates that following content of the paragraph should be interpreted by an OFSAA interpreter; a "% pgql" magic indicates that the following content of the paragraph should be interpreted by a PGQL interpreter, and a "% python" magic indicates content that should be interpreted by a Python interpreter. In response to these magic commands selecting an interpreter, the notebook kernel also provides the environment for execution of the paragraph content. For example, for a Python script, the kernel will spawn a python session to execute the script; for a PGQL query, the kernel will request execution of the code in a property graph server (PGX) session; and for a SQL query, the kernel will request a Java database connectivity (JDBC) connection to a SQL server to execute the command.

Thus, in one embodiment, notebook interface 220 supports scripting for advanced users (such as data scientists), while the pipeline interface 210 presents a reverse-generated visual pipeline representing the code (or script) as a series of granular tasks. The systems, methods, and other embodiments described herein for automatic two-way generation and synchronization of notebook and pipeline can automatically generate code (such as notebook paragraphs) from a pipeline and can automatically generate a pipeline from code, and can keep both the pipeline in the canvas and the model code in the notebook in synchronization. With the systems, methods, and other embodiments for automatic two-way generation and synchronization of notebook and pipeline described herein, the two interfaces 210, 220 are enabled to be used collaboratively, in real time, to develop application logic 215. In one embodiment, the features of the pipeline interface are implemented by pipeline interface subsystem 165 and the features of the notebook interface 220 are implemented by notebook interface subsystem 175.

In one embodiment, modeling meta-store and registration repository 225 is a data structure such as a graph database that includes information defining a pipeline. Repository 215 may include information defining connections (or links or edges) between nodes in the pipeline, such as catalog tables of edges and nodes. Repository 215 may include information describing contents of pipeline nodes, such as task type of the node, and a link (such as an API call) to a notebook paragraph that defines functionality of the node. In one embodiment, modeling meta-store and registration repository 225 is a database data structure in data store 130.

In one embodiment, a notebook is a draft that may undergo continued revision. A current draft 222 of a notebook may be stored as a fixed, static, or read-only copy 230 of the notebook by executing a "publish" function of notebook interface 220. Subsequent changes to draft notebook 222 do not modify static copy 230.

In one embodiment, application logic 215 is stored as one or more data structures representing nodes and links of a pipeline or paragraphs of a notebook in repository 225. Application logic 215 defines task (such as model and other function) inputs and outputs based on pipeline links and pipeline nodes, with application programming interface (API) calls (such as a REST API call) to paragraphs describing functions of a pipeline node defined in either draft notebook 222 or static copy 230. The analyst 205 may select the draft 222 or static 230 version prior to execution. Application logic 215 is executed 235 or performed by a computing system. Application logic 215 may be executed in different contexts, such as in ML model training where a ML model is included in application logic 215, testing and experimentation to evaluate the performance of application logic 215, or production with application logic 215 operating on production data. The results of execution 240 of application logic 215 may be written to storage 240, for example as a data structure in data stores 130, output or sent to another application 245 that uses the output results, or presented to analyst 205 in a graphical user interface (GUI) for decisioning or visualization 250. In one embodiment, there are end points (such as REST API) created for the pipeline that can accept inputs to the pipeline and provide results from the pipeline, and the output 245 is sent through these end points. One example other application is an application for online monitoring of model performance, which alerts when it detects significant drift in current model performance compared against initial performance, providing feedback and/or initiating a retuning process in response to the alert. In one embodiment, the output results may be collected during live operation or retrieved from storage 240 for presentation through visualization GUI 250. Example model logic 215 may be caused to execute by a trigger 255. Trigger 255 may be in response to a call from another application. Trigger 255 may be in response to scheduled operation, for example, the user may be presented with a menu in pipeline interface 210 allowing the user to schedule execution of a pipeline (for example, daily, monthly, at one particular time, etc.). Scheduled execution may be performed at the pipeline level or for subsections of the pipeline including one or more node, and execution of different portions of the pipeline may be subject to different schedules, for example, scheduling to run a scoring workflow daily, and to run a retraining node monthly. Trigger 255 may be in response to interactive initiation of model logic 215 (or components thereof) through user 205 interactions with pipeline interface (canvas) 210, such as user selection of execute buttons in pipeline interface 210.

In response to analyst 205 making a change to model logic 215 by adding or deleting a node in a pipeline representation of model logic 215 in pipeline interface 210, the processor may generate a notebook change 260 adding a notebook paragraph for the added node or deleting a paragraph for the deleted node in order to make notebook 220 consistent with the pipeline representation displayed in pipeline interface 210. In response to analyst 205 making a change to model logic 215 by adding or deleting a notebook paragraph in a notebook representation of model logic 215 in notebook interface 220, the processor may generate a pipeline change 265 adding a pipeline node for the added notebook paragraph or deleting a pipeline node for the deleted paragraph, and in both cases, reconnecting the links between nodes, in order to make canvas 210 consistent with the notebook representation displayed in notebook interface 220.

—Notebook and Pipeline Synchronization Service—

Figure 3:
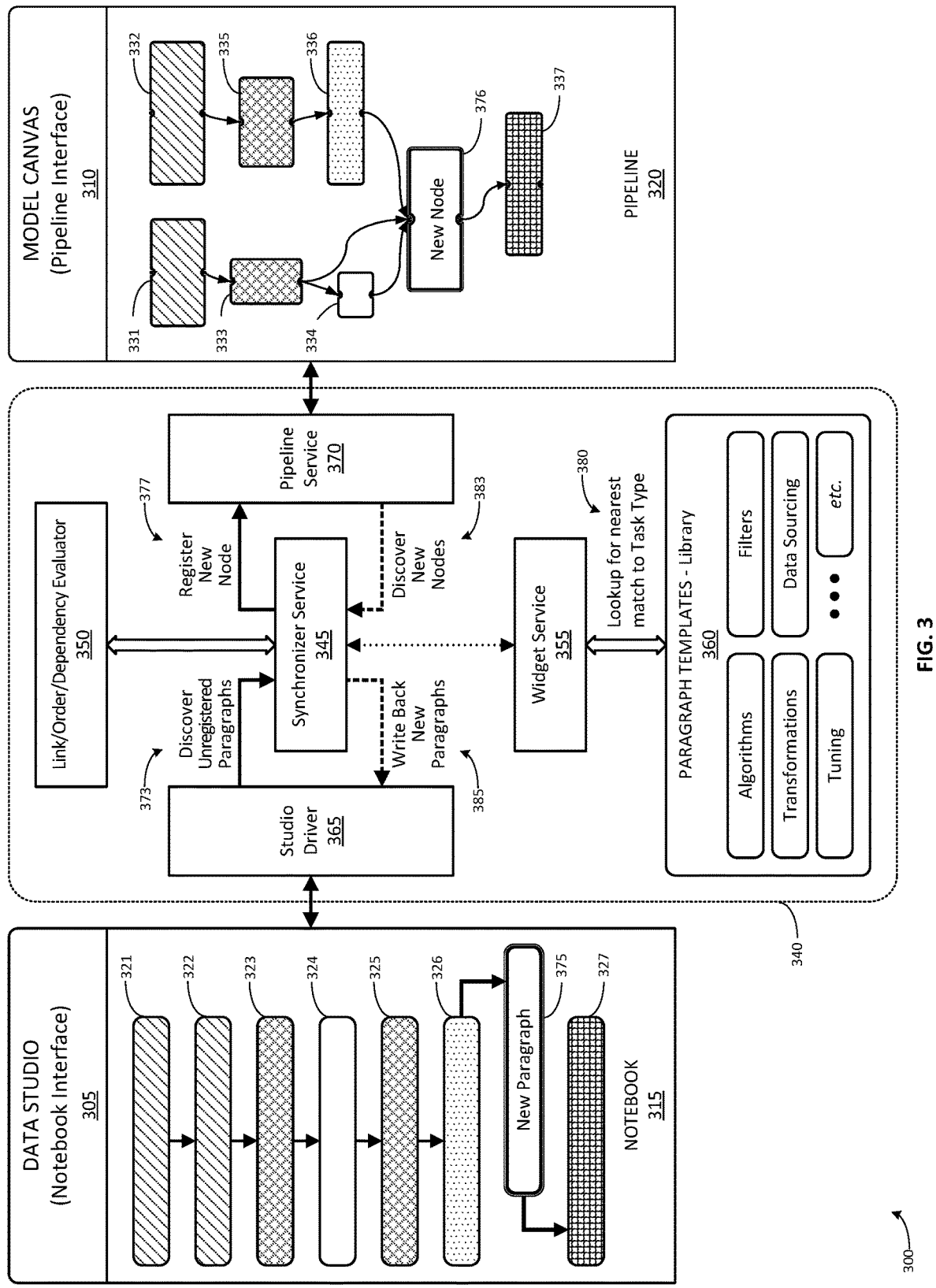
FIG. 3 illustrates one embodiment of system components for automatic two-way generation and synchronization of notebook and pipeline.

FIG. 3 illustrates one embodiment of system components 300 for automatic two-way generation and synchronization of notebook and pipeline. as used herein, the term "synchronize" or "synchronization" refers to causing a notebook to have paragraphs corresponding to nodes of a pipeline, and to causing a pipeline to have nodes corresponding to paragraphs of a notebook. In one embodiment, there is a one-to-one relationship, association, or correspondence between notebook paragraph and pipeline node. This relationship between node and paragraph indicates that code for performing a task represented by a node in the pipeline is included in a corresponding paragraph in the notebook. System components 300 include an example data studio or notebook interface 305, such as notebook interface 220. System components 300 include an example model canvas or pipeline interface 310. Notebook interface 305 presents a notebook 315 for user interaction. Pipeline interface 310 presents a pipeline 320 for user interaction. Notebook 315 includes notebook paragraphs 321-327. Pipeline 320 includes pipeline nodes 331-337. Notebook 315 and pipeline 320 are automatically synchronized by the operation of various synchronization components 340. In one embodiment, synchronization components 340 are modules of synchronization pipeline-notebook synchronizer subsystem 180. Synchronization components 340 include synchronizer service 345, link/order/dependency evaluator 350, widget service 355, paragraph templates library 360, studio driver 365, and pipeline service 370. In one embodiment, each of these components intercommunicate by way of REST APIs. Library 360 includes templates for algorithms, data sourcing, filters, transformations, tuning, and other tasks. In one embodiment, synchronization components 340 are executed by pipeline-notebook synchronizer subsystem 180 of cloud infrastructure system 105.

—Notebook and Pipeline Synchronization Service: Notebook to Pipeline—

In one embodiment, synchronization components 340 synchronize pipeline 320 with a notebook 315 to which a new paragraph unregistered by the pipeline has been added. In one embodiment, synchronizer service 345 converts code in notebook paragraphs to pipeline objects. In one embodiment, synchronizer service 345 operates to discover 373 unregistered new paragraphs in notebook 315. Studio driver 365 includes an API for create, read, update, delete (CRUD) operations against notebook 315, such as for reading identifiers for notebook paragraphs of notebook 315. In one embodiment, studio driver 365 parses notebook 315 to identify discrete paragraphs, for example by identifying paragraph boundaries in notebook 315. In one embodiment, synchronizer service 345 repeatedly polls studio driver 365 to determine whether an unregistered new paragraph 375 has been added to notebook 315. The polling may repeat every few seconds, for example approximately every 10 seconds, or for example every 30 seconds, allowing changes made to the notebook 315 to be detected (and propagated to pipeline 320) in real time when the notebook paragraph is created in the notebook 315. For greater simultaneity allowing for concurrent editing of notebook 305 and pipeline 310 interfaces, the polling may repeat more rapidly, for example once every second, but in practice polling at intervals of up to 600 seconds yields acceptable performance. In this manner, the processor executing synchronization components 340 repeatedly polls notebook representation of application logic in order to synchronize the pipeline and notebook representations in real time. In one embodiment, in a poll, synchronizer service 345 retrieves a list of unique identifiers of notebook 315 paragraphs through studio driver 365. Synchronizer service 345 compares the most recently retrieved list with a previously retrieved list to determine whether there is an additional paragraph not in the previously retrieved list. In one embodiment, synchronization service 345 receives an alert indicating that a change, such as addition of a new paragraph, has been made to notebook 315. Where there is a new paragraph 375, synchronizer 345 determines further whether the paragraph is "unregistered," meaning that the new paragraph 375 does not have a corresponding node in pipeline 320, for example by comparing the unique identifier of the new paragraph 375 with a list of identifiers for associated paragraphs of the nodes in pipeline 320 to determine if there is a match. If there is no match, the new paragraph 375 is unregistered, and a new, synced-up node 376 corresponding to new paragraph 375 should be added to pipeline 320. In response to discovery of unregistered new paragraph 375, synchronizer service 345 may retrieve unregistered new paragraph 375 (by issuing a read request to studio driver 365 and recording the response) for subsequent processing. If there is a match, the new paragraph 375 is already registered in pipeline 320 (for example, because new paragraph 375 was dynamically generated in response to the creation of a new pipeline node in pipeline 320), and no new pipeline node should be registered in pipeline 320.

In one embodiment, in response to detecting a synchronizer service 345 operates to register 377 a new node 376 in pipeline 320. Pipeline service 370 includes an API for CRUD operations against pipeline 320 (or against a modeling meta-store and registration repository 225 of the metadata describing pipeline 320) such as for creating new nodes in pipeline 320. In one embodiment, synchronizer service 345 registers a new pipeline node 376 into pipeline 320 immediately following the detection of unregistered new notebook paragraph 375 in notebook 315, allowing synchronization of pipeline 320 to include new pipeline node 376 that corresponds to new notebook paragraph 375 in real time. In one embodiment, synchronizer service 345 requests that link/order/dependency evaluator 350 determine a placement or location of new pipeline node 376 within pipeline 320. In one embodiment, synchronizer service requests that widget service 355 determine a task type to associate with the new pipeline node 376 corresponding to unregistered new paragraph 375. In one embodiment, synchronizer service 345 inserts the new pipeline node 376 into pipeline 320 in the location determined by evaluator 350 and with a task type determined by widget service 355.

In one embodiment, evaluator 350 makes the determination of placement within pipeline 320 based on placement of new paragraph 375 within an order of paragraphs in notebook 315. In one embodiment, evaluator 350 sorts the notebook paragraphs by identifying an order of execution of the notebook paragraphs in the notebook. In one embodiment, evaluator 350 may parse the contents of the notebook in order to identify the order in which the paragraphs appear. Evaluator 350 may store the identified order of execution by mapping the unique identifiers of notebook paragraphs to positions in the order of execution, for example in a key-value data structure. In one embodiment, the order of execution is simply the order in which notebook paragraphs appear in notebook 315. In one embodiment, evaluator 350 determines a notebook paragraph that immediately precedes the unregistered new paragraph 375 in the order, in this example, previous (order −1) paragraph 326. In one embodiment, evaluator 350 also determines a notebook paragraph that immediately follows the unregistered new paragraph 375 in the order, in this example, next (order +1) paragraph 327. Evaluator 350 identifies the pipeline nodes that correspond to the previous (order −1) and next (order +1) paragraphs, in this example pipeline nodes 336 and 337, respectively. Evaluator 350 thus determines the placement of new pipeline node 376 to be between pipeline nodes 336 and 337. Evaluator 350 stores or returns the determined placement location for subsequent use in inserting the new node 376 into pipeline 320.

In one embodiment, a notebook has no way to demarcate (functionally, outside of comments) the type of task or function performed by the functional script of a notebook paragraph. When a new paragraph is written in the notebook interface, and not using the pipeline interface, there may be an analysis to determine a task type that the pipeline object for the new paragraph should be displayed as. In one embodiment, synchronizer service 345 operates to look up 380 a closest task type to unregistered new paragraph 375. In one embodiment, synchronizer service 345 requests widget service 355 to parse contents of unregistered new paragraph 375 to figure out a type of task that the paragraph performs. Widget service 355 scans through paragraph content of unregistered new paragraph 375 to extract actions described in the paragraph, and compares those actions with a library of paragraph templates 360. In library 360, paragraph templates are categorized by type of task, such as algorithms, data hydration/dehydration, data preparation, data splitting, data sourcing, data quality check, experimentation, exploratory data analysis (EDA), event coding, feature extraction, filters, imputation, missing value treatment, prediction (such as model-based prediction), model training, statistical techniques, transformation (such as deterministic transformation), tuning, validation, etc. Library 360 may continue to grow through curation by users. Library 360 may also be used as the library of template code segments or template notebook paragraphs associated with placement of nodes in pipeline interface 310, enabling rapid code generation for existing task types. Widget service compares actions in unregistered new paragraph 375 with the template paragraphs to determine a most likely task type for unregistered new paragraph 375, based on exceeding some probabilistic confidence threshold, such as 60% confidence. For example, where widget service 355 detects an action such as read .csv or making a call to a database to refresh data in the contents of unregistered new paragraph 375, unregistered new paragraph 375 most likely performs a data sourcing type of task. In one embodiment, Widget service executes a machine learning (ML) classifier algorithm trained on the paragraph templates and associated task types in library 360 to classify unregistered new paragraph 375 as being of a particular task type. In one embodiment, the ML classifier algorithm is a Naïve Bayes algorithm, Support Vector Machine, or convolutional neural network. Where no task type is determined by widget service, for example where the confidence threshold is not satisfied for any type of task in library 360, a generic or non-defined task type is selected, and a user of canvas 310 may update the task type as the user sees fit. Widget service 355 returns the task type to synchronizer service 345, which automatically tags the new pipeline node as being of that task type. In one embodiment, in the pipeline interface GUI (in the canvas) 310 there are distinct node icons and/or color coding associated with the task type. Nodes representing a task of a particular type are displayed using the distinct icon or color coding for the task type. In this manner, generation of a new pipeline node may include steps of (i) analyzing a notebook paragraph that does not have a corresponding pipeline node to identify a type of task performed by the notebook paragraph, (ii) setting a new pipeline node to be of the type identified, and (iii) displaying the new node in the pipeline with an icon associated with the type of task.

In one embodiment, multiple new paragraphs, or an entire new notebook, may be added in notebook interface 305 in the course of a polling cycle. Multiple nodes will be added in response to the multiple new paragraphs in the same manner as described above for the addition of single nodes in response to creation of single new paragraphs. In one embodiment, generating multiple pipeline nodes from multiple new notebook nodes or an entire new notebook, the generated pipeline may represent the linear format of the notebook, with each node linked to the next in a linear sequence. This linear pipeline may then be adjusted by users in pipeline interface 310 to form branching, convergent, and parallel paths in the pipeline. While in one embodiment, links or edges are not part of the notebook representation of application logic, the links between nodes are maintained in the metadata of the pipeline 320 representation of the application logic. In this manner, a notebook paragraph is automatically abstracted as a pipeline node or task (that is, as a named object) and the notebook code encapsulated and callable as a REST API.

—Notebook and Pipeline Synchronization Service: Pipeline to Notebook—

In one embodiment, synchronization components 340 synchronize notebook 315 with a pipeline 320 to which a new node unregistered by the notebook has been added. In one embodiment, synchronizer service 345 converts pipeline nodes to notebook paragraph code. In one embodiment, synchronizer service 345 operates to discover 383 new pipeline nodes in pipeline 320 and write 385 corresponding new paragraphs into notebook 315. Creation of a new node in pipeline 320 involves selection of a node type and placement of the node into the pipeline 320 using canvas 310. Each node type is associated with a template notebook paragraph containing the functional script for the node. The template paragraph is initially stored in modeling meta-store and registration repository 225 in association with the new pipeline node. Placeholders in the template paragraph may be given values based on interaction with the new node. Each node type has an associated task type that controls the visual representation of the node within canvas 310. Links of pipeline 320 can be added or revised to connect the new node to the pipeline. Each node in pipeline 320 may have a unique identifier.

In one embodiment, synchronizer service 345 repeatedly polls pipeline 320 through pipeline service 370 to determine if new nodes have been created in pipeline 320. In one embodiment, the processor executing synchronization components 340 repeatedly polls the pipeline representation of application logic in order to synchronize the pipeline and notebook representations in real time, in a manner similar to that described above for polling the notebook. For example, synchronizer service 345 determines whether a node is present in pipeline 320 that was not present at the last polling, and determines whether or not a notebook paragraph corresponding to that node is present in notebook 315. In one embodiment, synchronizer service 345 compares a list of nodes (for example, a list of unique node IDs) currently in pipeline 320 to a list of nodes in pipeline 320 at the last poll. If there is a node not in the list of nodes at the last poll, a new node exists, which may need to have a corresponding notebook paragraph added to notebook 315. In one embodiment, synchronization service 345 receives an alert indicating that a change, such as addition of a new node, has been made to pipeline 320, which may need to have a corresponding notebook paragraph added to notebook 315. Synchronizer service 345 then determines whether a notebook paragraph corresponding to the new node should be added to notebook 315 by determining whether or not a corresponding paragraph already exists in notebook 315. In one embodiment, synchronizer service 345 determines whether or not a corresponding paragraph already exists by examining the metadata representing the new node in modeling meta-store and registration repository 225. Synchronizer service 345 determines whether the underlying paragraph for the node is held in meta-store 345 in the metadata representing the new node, or whether there is a reference or API call to a notebook paragraph in meta-store 225 in the metadata representing the new node. Where the paragraph itself is held in the metadata for the new node, then that indicates that the new node has been created using pipeline interface 310, and that no notebook paragraph corresponding to the new node has yet been created in notebook 315, and should be added to notebook 315. In one embodiment, synchronizer service 345 operates to remove the paragraph from the metadata representing the new node in meta-store 225, and it as a new paragraph into notebook 315, and add a link, reference, or API call to the new paragraph in the notebook 315 to the metadata representing the new node. In one embodiment, synchronizer service 345 requests that link/order/dependency evaluator 350 determine a placement location for the new paragraph within notebook 315. Where the reference or API call to the notebook paragraph is in held in the metadata, then the notebook paragraph for the new node already exists in notebook 315, and does not need to be added to notebook 315.

In one embodiment, evaluator 350 makes the determination of placement of the new paragraph within notebook 315 based on placement of the new node within pipeline 320. In the example notebook 315 and pipeline 320 shown, paragraph 321 corresponds to node 331, paragraph 322 corresponds to node 332, paragraph 323 corresponds to node 333, paragraph 324 corresponds to node 334, paragraph 325 corresponds to node 335, paragraph 326 corresponds to node 336, paragraph 327 corresponds to node 337. In one embodiment, evaluator 350 back-traces—that is, traces paths from a node through preceding nodes to one or more beginning points—the pipeline 320 to identify all nodes that precede new node 376 in pipeline 320. These preceding nodes (in this example, nodes 331-336) execute before new node in pipeline 320. Evaluator 350 identifies the corresponding paragraphs in notebook 315 (in this example, nodes 321-336) for example by identifying the unique identifiers of these corresponding paragraphs from the metadata describing the preceding nodes. Evaluator 350 returns a list of paragraph identifiers to synchronizer service 345. Synchronizer service 345 instructs studio driver 365 to insert new paragraph 375 into notebook 315 following all of the identified paragraphs that correspond to the preceding nodes (in this example, following paragraph 326). In this manner, generation of a new notebook paragraph may include steps of (i) determining or identifying a set of paragraphs of the notebook on which execution of the new notebook paragraph depends; and (ii) inserting the new notebook paragraph into the notebook following the set of paragraphs.

In one embodiment, notebook interface 305 assigns a unique identifier to new paragraph 375. Studio driver 365 receives or retrieves the identifier of new paragraph 375 and provides it to synchronizer service 345. Synchronizer service 345 instructs pipeline service 370 to add a reference or API request to the new paragraph 375 (using the unique identifier) to the metadata describing new node 376. This enables pipeline interface 310 to cause execution of new paragraph 375 when new node 376 is executed. This also enables the content of new paragraph 375 to be accessed and edited through user interaction with new node 376 in pipeline interface 310. In one embodiment, a notebook (such as notebook 315) has API endpoints for specific functions regarding the notebook. For example there are API endpoints for executing the whole notebook, executing, viewing, editing, or deleting particular paragraphs of the notebook, creating new paragraphs in the notebook, publishing the notebook, etc. In one embodiment, API requests for executing, viewing, editing, or deleting particular paragraphs within the notebook, such as new paragraph 375, use the unique identifier to select the paragraph for execution, viewing, editing, or deletion. In this manner, the notebook paragraph is encapsulated with an application programming interface, and a notebook paragraph may be executed, viewed, edited, or deleted in response to an application programming interface call (such as a REST API request) from the pipeline interface.

Accordingly, the systems, methods, and other embodiments described herein enable automatic synchronization of notebook changes (code) to the visual pipeline (representing & encoding a model or other application logic) and vice versa: changes to either one of pipeline or notebook trigger a refresh alert that can regenerate the pipeline or the notebook.

In one embodiment, synchronizer service 345 may check notebook code changes in notebook paragraphs for validity in the pipeline. Any attempt to change notebook code in ways that break the integrity of the pipeline automatically triggers an alert. Also, synchronizer service 345 may check pipeline changes for validity in the notebook. In some embodiments, the order of operations defined by the pipeline is not possible in the notebook due to the sequential execution of paragraphs by the notebook interface. Accordingly, the application logic may only be executed in the proper order from the pipeline interface. This situation will also trigger an alert. The alert may be presented in both notebook interface 305, and pipeline interface 310, for example as a pop-over window containing a message describing the problematic change or order of operations. In one embodiment, the alert is also sent in a message to an address associated with a user with authority to review the application logic. In this manner, an alert message may be generated in response to identification of the difference between pipeline and notebook representations of application logic; and the alert message may be transmitted for display in at least one of the pipeline user interface and the notebook user interface.

Advantageously, the synchronization in both directions occurs in real time, without using a batch process or shutdown-restart cycle of the data integration and modeling service, as and when a pipeline node or notebook paragraph is added.

—Example Method—

In one embodiment, each step of computer-implemented methods described herein may be performed by a processor (such as processor 810 as shown and described with reference to FIG. 8) of one or more computing devices (i) accessing memory (such as memory 815 and/or other computing device components shown and described with reference to FIG. 8) and (ii) configured with logic to cause the system to execute the step of the method (such as automatic two-way notebook and pipeline generation and synchronization logic 830 shown and described with reference to FIG. 8). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 815, or storage/disks 835 of computing device 805 or remote computers 865 shown and described with reference to FIG. 8, or in data stores 130 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 4:
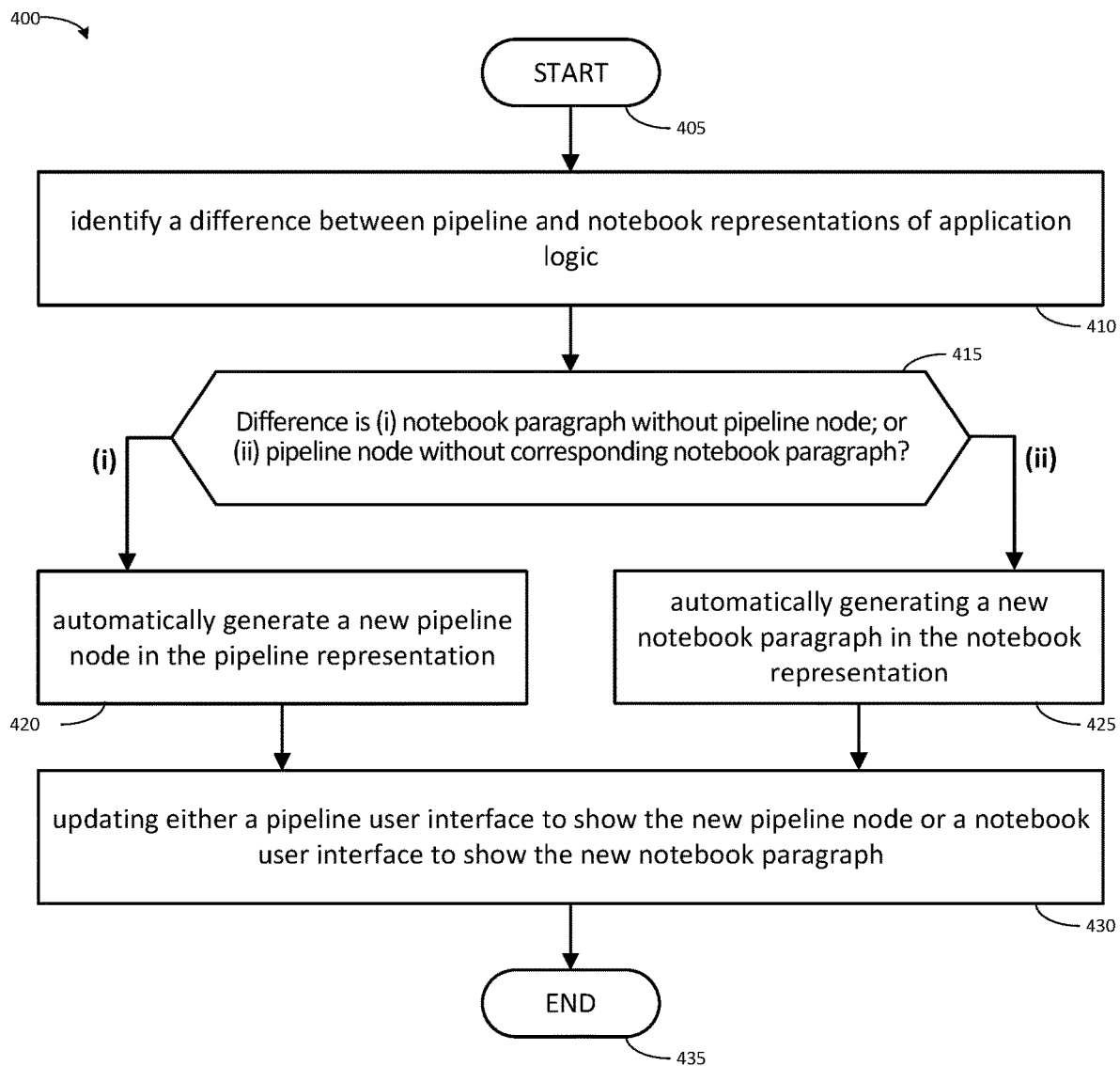
FIG. 4 illustrates one embodiment of a method associated with automatic two-way generation and synchronization of notebook and pipeline.

FIG. 4 illustrates one embodiment of a method 400 associated with automatic two-way generation and synchronization of notebook and pipeline. In one embodiment, the steps of method 400 are performed by pipeline-notebook synchronizer subsystem 180 (as shown and described with reference to FIG. 1). In one embodiment, pipeline-notebook synchronizer subsystem 180 is a special purpose computing device (such as computing device 805) configured with automatic two-way notebook and pipeline generation and synchronization logic 830. In one embodiment, pipeline-notebook synchronizer subsystem 180 is a module (or collection of modules, such as modules for synchronization components 340 as shown and described with reference to FIG. 3) of a special purpose computing device configured with logic 830. In one embodiment, the steps of method 400 (and other methods, systems, and embodiments described herein) enable real time automatic synchronization of notebook-style user interface inputs and pipeline-style user interface inputs on the same application logic, where such real time synchronization was not previously possible to be performed by computing devices. In one embodiment, the steps of method 400 (and other methods, systems, and embodiments described herein) improves the technology of computer model development technology by unifying notebook style development and pipeline style development of a computer model, where these two styles of interface were previously incompatible, enabling collaborative development of a computer model by users of the different styles of interface.

The method 400 may be initiated automatically based on various triggers, such as in response to receiving a signal over a network or parsing stored data indicating that (i) a user (or administrator) of system 100 has initiated method 400, (ii) that method 400 is scheduled to be initiated at defined times or time intervals, such as at a polling interval discussed above, or (iii) that method 400 is to be initiated in response to a change in one of a pipeline representation of application logic and a notebook representation of application logic. The method 400 initiates at START block 405 in response to parsing a signal received or stored data retrieved and determining that the signal or stored data indicates that the method 400 should begin. Processing continues to process block 410.

At process block 410, the processor identifies a difference between pipeline and notebook representations of application logic. In one embodiment, the difference is one of (i) a notebook paragraph without a corresponding pipeline node and (ii) a pipeline node without a corresponding notebook paragraph. In one embodiment, the processor polls a notebook and a pipeline and determines whether either has been updated since a previous poll, for example by comparing a record of the state of the notebook or pipeline at the time of the previous poll with the state of the notebook or pipeline at the time of the current poll, or for example by requesting a timestamp of a latest update to the notebook or pipeline and comparing it with a timestamp of the previous poll. Where an update has occurred, the processor retrieves a identifier of a notebook paragraph associated with the updated notebook or pipeline. Recall, as discussed above, notebook paragraphs have a unique identifier in the notebook, and the pipeline refers to the notebook paragraph for its underlying logic. Processor then searches the non-updated notebook or pipeline for the unique identifier. If it is not present, then there is a difference between the pipeline and notebook representations of the application logic. In one embodiment, these steps are performed by synchronization components 340 of synchronizer subsystem 180. In one embodiment, the difference is detected as described for discovery of unregistered paragraphs 373 and discovery of new nodes 383 shown in and described with respect to FIG. 3. Once the processor has thus completed identifying a difference between pipeline and notebook representations of application logic, and processing continues to decision block 415.

At decision block 415, the processor determines whether the difference is (i) a notebook paragraph without a corresponding pipeline node; or (ii) a pipeline node without a corresponding notebook paragraph. In one embodiment, the processor determines that the difference is (i) a notebook paragraph without a corresponding pipeline node where there is a new paragraph in the notebook that is not referred to by any node of the pipeline, as discussed above with reference to FIG. 3. In one embodiment, the processor determines that the difference is (ii) a pipeline node without a corresponding notebook paragraph where there is a new pipeline node that is storing its functional script in a modeling meta store and registration repository instead of in the notebook. In one embodiment, this determination is made by synchronization components 340 of synchronizer subsystem 180. Where the processor has thus determined that the difference is (i) a notebook paragraph without a corresponding pipeline node, processing at decision block 415 completes, and processing continues to process block 420. Where the processor has thus determined that the difference is (ii) a pipeline node without a corresponding notebook paragraph, processing at decision block 415 completes, and processing continues to process block 425.

At process block 420, the processor synchronizes the pipeline representation and notebook representation by, for the notebook paragraph that does not have a corresponding pipeline node, automatically generating a new pipeline node in the pipeline representation. In one embodiment, the processor parses the script of the notebook paragraph to detect keywords that indicate a task type performed by the notebook paragraph, or analyzes the script of the notebook with a ML classification algorithm to determine a task type for the new pipeline node, for example as discussed above with reference to lookup 380, widget service, 355, and library 360 of FIG. 3. In one embodiment, the processor evaluates the position of the notebook paragraph within the notebook to determine the placement of the new pipeline node within the pipeline representation, for example as discussed above with reference to link/order/dependency evaluator 350 of FIG. 3. The processor then configures the new node to have the determined task type, and sets the notebook paragraph to be the functional script of the node. The processor inserts the new node into the pipeline representation at the location at the determined placement location, and links the new node into the pipeline representation. In one embodiment, these steps are performed by synchronization components 340 of synchronizer subsystem 180. Once the processor has thus completed synchronizing the pipeline representation and notebook representation by, for the notebook paragraph that does not have a corresponding pipeline node, automatically generating a new pipeline node in the pipeline representation, processing at process block 420 completes, and processing continues to process block 430.

At process block 425, the processor synchronizes the pipeline representation and notebook representation by, for the pipeline node that does not have a corresponding notebook paragraph, automatically generating a new notebook paragraph in the notebook representation. In one embodiment, in response to creation of the pipeline node in the pipeline representation, the processor retrieves a template functional script for nodes of the type selected for the created pipeline node, and writes the template script to a modeling meta store and registration repository that describes the pipeline representation. The processor analyzes the location within the pipeline of the created node to determine a position within the notebook at which to place a new notebook paragraph corresponding to the created node, for example as discussed above with reference to evaluator 350 of FIG. 3. The processor executes a query (such as a PGQL query) against the repository to retrieve the template script and remove the template script from the repository. The processor then executes an API request to the notebook to create a new notebook paragraph at the determined position, and populates the new notebook paragraph with the template script. In one embodiment, these steps are performed by synchronization components 340 of synchronizer subsystem 180. Once the processor has thus completed synchronizing the pipeline representation and notebook representation by, for the pipeline node that does not have a corresponding notebook paragraph, automatically generating a new notebook paragraph in the notebook representation, processing at process block 425 completes, and processing continues to process block 430.

At process block 430, the processor updates either a pipeline user interface to show the new pipeline node or a notebook user interface to show the new notebook paragraph. In one embodiment, the processor forces a refresh in a pipeline GUI in response to the insertion of a new node or forces a refresh in a notebook GUI in response to the insertion of a new paragraph. The processor composes a message, such as a REST request, to cause the refresh, and transmits the request for execution by a web browser or other application on which a user is viewing a notebook or pipeline GUI for data integration and modeling service 120. The message is transmitted promptly in response to the completion of the insertion to maintain practical real time synchronization between notebook and pipeline user interfaces. In one embodiment, these steps are performed by synchronization components 340 of synchronizer subsystem 180 and web interface server 135. Once the processor has thus completed updating either a pipeline user interface to show the new pipeline node or a notebook user interface to show the new notebook paragraph, processing at process block 430 completes, and processing continues to END block 435, where process 400 ends.

Figure 5:
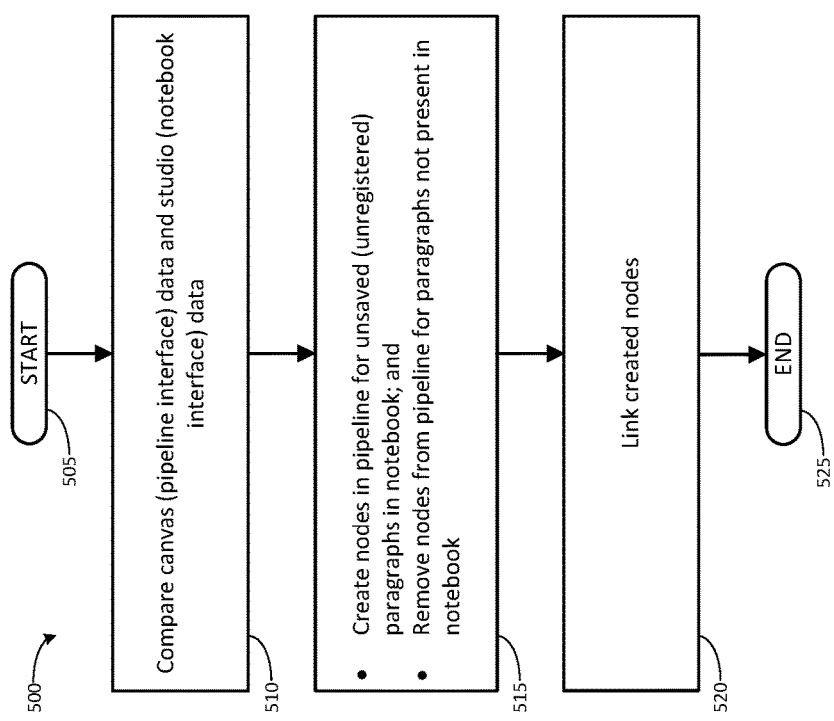
FIG. 5 illustrates another embodiment of a method associated with automatic two-way generation and synchronization of notebook and pipeline.

FIG. 5 illustrates another embodiment of a method 500 associated with automatic two-way generation and synchronization of notebook and pipeline. In one embodiment, the steps of method 500 are performed by pipeline-notebook synchronizer subsystem 180 (as shown and described with reference to FIG. 1) in a manner similar to that described for method 400 above. The method 500 may be initiated automatically based on similar triggers to those described for method 400 above. The method 500 initiates at START block 505 in response to parsing a signal received or stored data retrieved and determining that the signal or stored data indicates that the method 500 should begin. Processing continues to process block 510.

At process block 510, the processor compares canvas (pipeline interface) data and studio (notebook interface) data. In one embodiment, the processor compares pipeline data and notebook data to identify a notebook paragraph that is unregistered as a pipeline node, for example as discussed in further detail elsewhere herein with reference to FIG. 3 and blocks 410 and 415 of FIG. 4. In one embodiment, the processor compares pipeline data and notebook data to identify a pipeline node that does not have a corresponding paragraph in the notebook, for example as discussed in further detail elsewhere herein with reference to FIG. 3 and blocks 410 and 415 of FIG. 4. Processing at process block 510 completes and processing continues at process block 515.

At process block 510, the processor (i) creates nodes in a canvas (pipeline) for unsaved or unregistered paragraphs in a notebook, and (ii) removes nodes from the canvas (pipeline) for paragraphs not present in the notebook. In one embodiment, for creation of nodes, the processor automatically generates a pipeline node in the pipeline corresponding to the unregistered notebook paragraph, for example as discussed in further detail elsewhere herein with reference to FIG. 3 and block 420 of FIG. 4.

In one embodiment, synchronizer service 345 operates to discover paragraphs that have been deleted from notebook 315. In one embodiment, as discussed above, studio driver 365 parses notebook 315 to identify discrete paragraphs. In one embodiment, synchronizer service 345 repeatedly polls studio driver 365 to determine whether an existing paragraph has been removed from notebook 315. In one embodiment, in a poll, synchronizer service 345 retrieves a list of unique identifiers of notebook 315 paragraphs through studio driver 365. Synchronizer service 345 compares the most recently retrieved list with a previously retrieved list to determine whether there is a paragraph in the previously retrieved list that is not in the most recently retrieved list, thereby identifying a removed or deleted paragraph. Synchronizer service 345 then operates to determine whether there is a node in the pipeline that corresponds to the deleted paragraph. In one embodiment, in response to a request generated by synchronizer service 345, pipeline service 370 to queries repository 225 to request the identity of a node that refers to the deleted paragraph (the "node to be deleted"), and where any such node to be deleted is present in pipeline 320, to delete it from the pipeline. In one embodiment, deletion includes deleting the link between the previous (order −1) node and the node to be deleted, deleting the node to be deleted, and changing the origin of the link between the node to be deleted and the next (order +1) node to be the previous (order −1) node. This maintains the link type of the link from the node to be deleted.

Thus, in one embodiment, the synchronization process also propagates deletions from pipeline to notebook or from notebook to pipeline—for the notebook paragraph that does not have a corresponding pipeline node, determining that the corresponding pipeline node was not deleted through the pipeline user interface, and for the pipeline node that does not have a corresponding notebook paragraph, determining that the corresponding notebook paragraph was not deleted through the notebook user interface. Processing at process block 515 completes and processing continues at process block 520.

Figure 6:
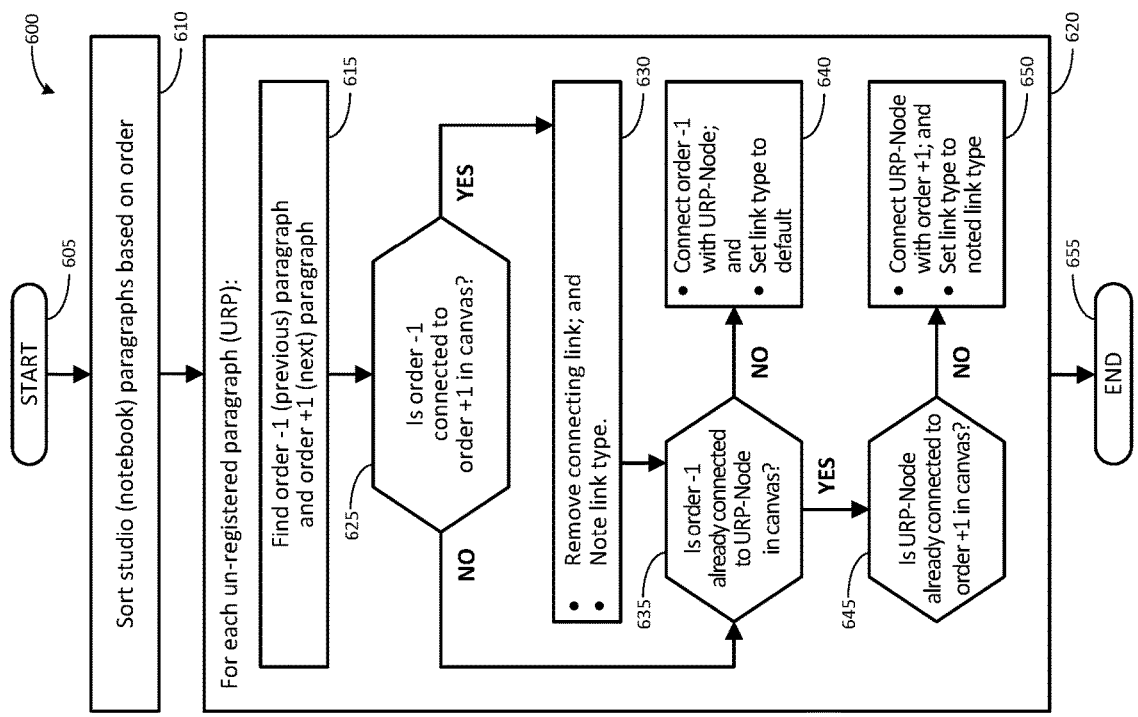
FIG. 6 illustrates one embodiment of a method for linking new pipeline nodes associated with automatic two-way generation and synchronization of notebook and pipeline

At process block 520, the processor links recently added nodes. In one embodiment, the processor links the generated pipeline node into the pipeline as shown in and described with reference to FIG. 6. FIG. 6 illustrates one embodiment of a method 600 for linking new pipeline nodes associated with automatic two-way generation and synchronization of notebook and pipeline. In one embodiment, the steps of method 600 are performed by pipeline-notebook synchronizer subsystem 180 (as shown and described with reference to FIG. 1) in a manner similar to that described for method 400 above. The method 600 may be initiated automatically, for example, in response to receiving a signal or parsing stored data indicating that a new pipeline node has been added to a pipeline. The method 600 initiates at START block 605 in response to parsing a signal received or stored data retrieved and determining that the signal or stored data indicates that the method 500 should begin. Processing continues to process block 610.

At process block 610, the processor sorts notebook paragraphs based on the order of execution of those paragraphs in the notebook. This is a preliminary step performed because the order of paragraph identifiers may not correspond to the order of execution, and the paragraphs should be evaluated based on order of execution, not order of inclusion in the notebook. In one embodiment, the processor parses the content of the notebook to identify paragraphs in the order that the paragraphs appear in the notebook and extract the unique ID of the paragraph, and write the unique IDs for the paragraphs into a list in the order that the paragraph appears. The list of unique paragraph IDs in the order that the paragraphs identified by the IDs appear is a sort of the notebook paragraphs based on the order of execution in the notebook because notebook execution of paragraphs is sequential. Processing at process block 610 completes and processing continues to process block 615 within loop 620.

In one embodiment, there may be more than one unregistered paragraph (a paragraph without a corresponding node in the pipeline) for which a new node needs to be linked into the pipeline. Accordingly, processing loop 620 repeats a linking process for unregistered paragraphs. At process block 615, the processor finds a paragraph that is previous (order −1) to the unregistered paragraph in the execution order and finds a paragraph that is next (order +1) after the unregistered paragraph in the execution order. In one embodiment, the processor parses the ordered list of unique paragraph IDs to locate a paragraph ID of the unregistered paragraph. The processor then selects the paragraph IDs immediately preceding and immediately following the paragraph ID of the unregistered paragraph in the list. The processor then selects the paragraph having the immediately preceding paragraph ID to be the previous (order −1) paragraph, and selects the paragraph having the immediately following paragraph ID to be the next (order +1) paragraph. In one embodiment, the identification of paragraph order and finding of previous and next paragraphs is made by evaluator 350 as shown and described with reference to FIG. 3. Processing at process block 615 completes and processing continues to decision block 625.

At decision block 625, the processor determines whether or not a first node corresponding to previous (order −1) paragraph is connected in the pipeline interface to a second node corresponding to next (order +1) paragraph. In one embodiment, the processor queries repository 225 to determine whether any link connected to the first node connects to the second node. If so, (625: YES) processing at decision block 625 completes and processing continues to process block 630. If not, (625: NO) processing at decision block 625 completes and processing continues to decision block 635. In one embodiment, the determination is made by evaluator 350 and other synchronization components 340 as shown and described with reference to FIG. 3.

At process block 630, the processor removes the connecting link between the first and second node, and notes the link type. Links may have a link type property that is used by pipeline interface 310 to direct one or more aspects of pipeline execution at runtime. In one embodiment, the processor executes a query against repository 225 to read a link type of the connecting link, and records the retrieved value of the link type for subsequent processing. The processor then executes a query against repository 225 to delete the connecting link. In one embodiment, the queries are executed by pipeline service 370 in response to a request by synchronization service 345, as shown and described with reference to FIG. 3. Processing at process block 630 then completes and processing continues at decision block 635.

At decision block 635, the processor determines whether or not the first node (that corresponds to the previous, order −1 paragraph) is already connected in the pipeline to the node corresponding the unregistered paragraph (URP-Node). In one embodiment, the processor queries repository 225 to determine whether any link connected to the first node connects to the URP-Node. If not, (635: NO) processing at decision block 635 completes, and processing continues to process block 640. If so, (635: YES) processing at decision block 635 completes, and processing continues to decision block 645. In one embodiment, the queries are executed by pipeline service 370 and the determination made by synchronization service 345, as shown and described with reference to FIG. 3.

At process block 640, the processor connects the first node to the URP node in the pipeline and sets the link between the first node and the URP-Node to a default link type. In one embodiment, processor generates and executes one or more queries to repository 225 to make this connection. Execution of the query causes the processor to add a new link to a link table for the pipeline in repository 225, set the origin node of the link to be the first node, for example by writing the node ID of the first node into an origin node ID field of the link, and set the destination node of the link to be the URP-Node, for example by writing the node ID of the URP-Node into a destination node ID field of the link. In one embodiment, the queries are REST API requests from synchronization service 345 executed by pipeline service 370 (shown and described with reference to FIG. 3). Processing at process block 640 then completes.

At decision block 645, the processor determines whether or not the URP-Node is already connected in the pipeline to the second node (that corresponds to the next, order +1 paragraph). In one embodiment, the processor queries repository 225 to determine whether any link connected to the URP-Node connects to second node. If not, (645: NO) processing at decision block 645 completes, and processing continues to process block 650. If so, (645: YES) processing at decision block 645 completes. In one embodiment, the queries are executed by pipeline service 370 and the determination made by synchronization service 345, as shown and described with reference to FIG. 3.

At process block 650, the processor connects the URP-Node in the pipeline with the second node and sets the link between the URP-Node and the Second node to the noted link type. In one embodiment, the processor retrieves the noted link type, and generates and executes one or more queries to repository 225 to make this connection. Execution of the query causes the processor to add a new link to a link table for the pipeline in repository 225, set the origin node of the link to be the URP-Node, for example by writing the node ID of the URP-Node into an origin node ID field of the link, set the destination node of the link to be the second node, for example by writing the node ID of the second node into a destination node ID field of the link, and set the link type to the noted link type. In one embodiment, the queries are REST API requests from synchronization service 345 executed by pipeline service 370 (shown and described with reference to FIG. 3). Processing at process block 650 then completes.

Loop 620 then repeats for the next unregistered paragraph until no unregistered paragraphs remain. Loop 620 then completes, and processing continues to END block 655, where process 600 ends.

In this manner, the generation of a new pipeline node may include a linking process of: sorting paragraphs of the notebook based on order of execution; identifying (i) a first paragraph immediately preceding the notebook paragraph that does not have a corresponding pipeline node in the order of execution, and (ii) a second paragraph immediately subsequent to the notebook paragraph that does not have a corresponding pipeline node in the order of execution; removing a connecting link in the pipeline representation between a first node corresponding to the first paragraph and a second node corresponding to the second paragraph; recording a type of the connecting link; linking the first node to the new pipeline node with a new link of a default type; and linking the new pipeline node to the second node with a new link of the recorded type. Referring again to FIG. 5, processing at process block 520 completes with the completion of method 600 and processing continues to end block 525, where method 500 ends.

—Example Pipeline Graphical User Interface—

Figure 7:
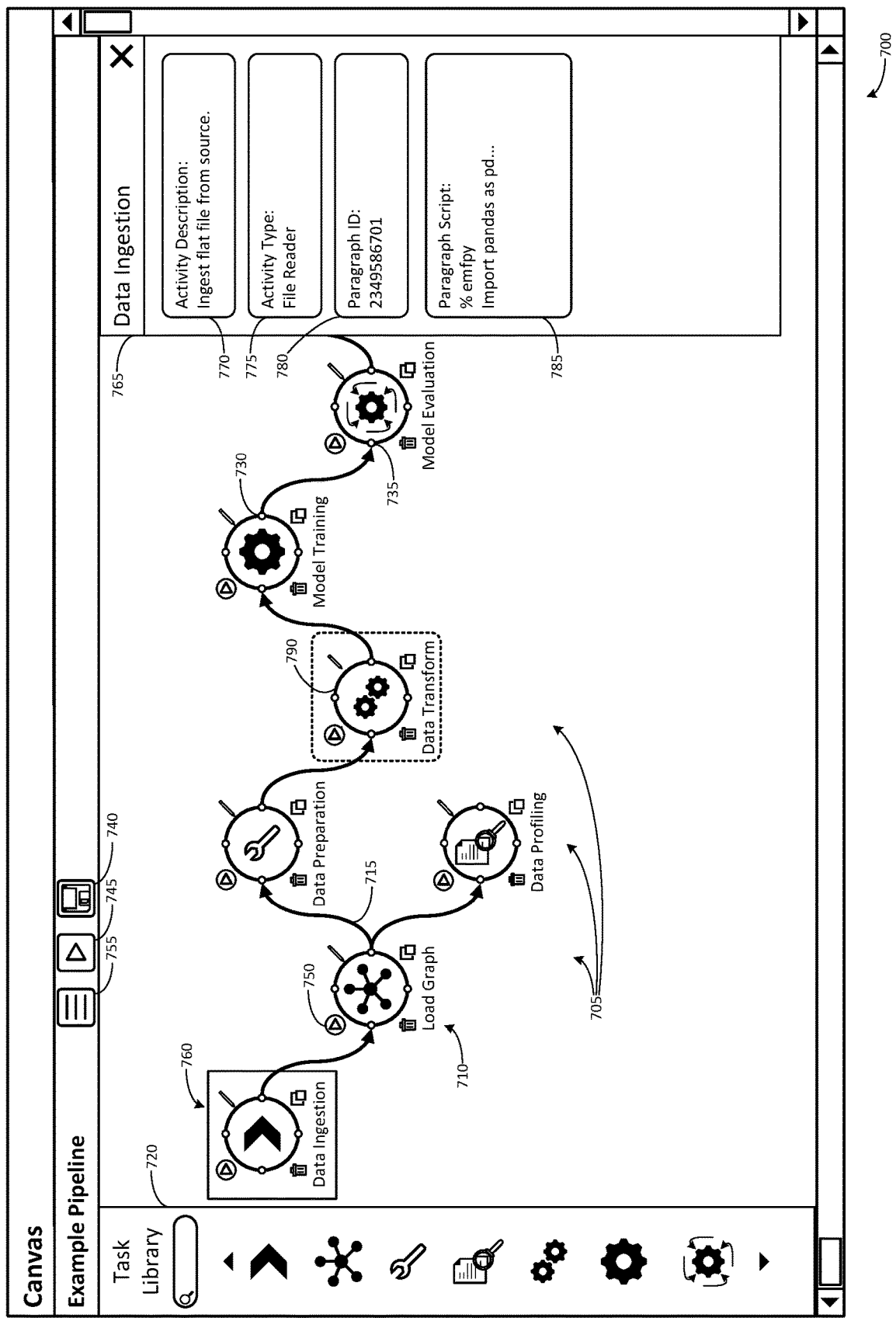
FIG. 7 illustrates one embodiment of a pipeline graphical user interface associated with automatic two-way generation and synchronization of notebook and pipeline.

FIG. 7 illustrates one embodiment of a pipeline graphical user interface (GUI) 700 associated with automatic two-way generation and synchronization of notebook and pipeline. Pipeline GUI 700 shows an example pipeline 705 made up of a set of nodes (such as "load graph" node 710) and links (such as link 715) that interconnect the nodes in a particular order. Pipeline GUI 700 includes a task library menu 720 from which a user may select pipeline node type and create a new pipeline node of that type in the pipeline, for example by clicking on an icon for a particular node type in menu 720, dragging the cursor to a position in the pipeline, and releasing it to form a new node of the selected type. A pipeline node is sometimes referred to herein as a "widget." "Widgets" as used herein may also include pre-configured pipeline segments with multiple linked nodes for performing core complex tasks, which may be similarly dragged and dropped into a pipeline. The new node is recorded in a data structure for example pipeline 705 in modeling meta-store and registration repository 225. There is a type associated with the new node. Each type has a template script paragraph that, when executed, performs the task functionality of the node. In response to creating the new node, a template script paragraph is created, for example initially in repository 225, and subsequently synchronized to the notebook as a notebook paragraph, as discussed above with reference to FIG. 3. In one embodiment, the user may also add a generic node, which has no template script. The generic node may then by tagged with a type by the user, and the user can script the generic node manually. The manual script will then be synchronized to the notebook. Note that, following the synchronization of the script paragraph for the new node into the notebook, the notebook paragraph for the new node is the authoritative copy of the script content. The script used to provide the functionality of the node is not stored in multiple places, but only in the notebook paragraph. The notebook paragraph of the script for the new node is accessed, edited, and executed through API calls to the notebook.

Links between nodes may be created by clicking on a first node connection point (such as connection point 730) and dragging the cursor to a second node connection point (such as connection point 735) to form a new link. The new link is recorded in a data structure for example pipeline 705 in repository 225. Nodes and links may also be deleted from example pipeline 705, for example by selecting them with the cursor and selecting a delete icon, delete menu option, or pressing a delete key. Changes to example pipeline 705 may be saved in response to selection of a save button 740. Example pipeline 705 may be caused to execute in response to selection of a pipeline execute button 745. One or more individual nodes in example pipeline 705 may be caused to execute independently of other pipeline nodes in response to user selection of a node execute button, such as node execute button 750 to cause load graph node 710 to execute. These execute buttons enable interactive execution (acting as an interactive trigger 255) of example pipeline 705, in whole or in part. In one embodiment, a menu may be launched in response to selection of a menu button 755. The user may provide runtime parameters for the pipeline through the menu.

In one embodiment, selection of a node, such as selection of data ingestion node 760, may launch a menu 765 that displays details of the node. Menu 765 may include an activity description 770 that describes the task performed by the node, an activity type 775 that dictates the displayed type of the node, a paragraph ID 780 that records the unique identifier of the notebook paragraph that provides the functionality of the node, and the functional script 785 as it is stored in the notebook paragraph. In one embodiment, activity description 770, activity type 775, and paragraph script 785 are user-editable. For example, the user may modify script 785 in the notebook through menu 765. In one embodiment, activity description 770 and activity type 775, are stored in repository 225, while script 785 is stored in the notebook and interacted with through API requests. In this way, a pipeline interface provides an alternate interface to create, modify, and execute application logic recorded as notebook paragraphs. Thus, the user may access the notebook paragraph within the pipeline user interface and edit the notebook paragraph within the pipeline user interface, and the edits in the pipeline user interface modify the notebook paragraph within the notebook representation of application logic.

Content updates to notebook paragraphs from the pipeline interface do not need to be synchronized as described herein, because the content (that is, the script) of the notebook paragraphs is not kept in multiple places, and is stored in a single location: the notebook. The cases for synchronization are where something new (a node or paragraph) appears or is added in one of the interfaces, or something old or existing (a node or paragraph) disappears or is removed from one of the interfaces.

In one embodiment, a new notebook paragraph describing a data transformation is written by a user in a notebook corresponding to example pipeline 705. Example pipeline 705 is then synchronized with the notebook, and a new data transform node 790 automatically appears in example pipeline 705. New data transform node 790 is automatically placed in the correct location, with links automatically generated and attached (for example as shown in and described with reference to FIG. 6) to incorporate new data transform node 790 into example pipeline 705.

—Selected Advantages—

The systems, methods, and other embodiments for automatic two-way generation and synchronization of notebook and pipeline described herein enable a number of advantages and improvements, including (1) automatic synchronization between the representation of application logic in the pipeline user interface (the business-user artifact) and representation of application logic in the notebook user interface (the modeler-user artifact); (2) reverse-generation and insertion of new nodes into a linked pipeline based on user-input creation of a new paragraph in a notebook; (3) unification of code generation with the visual pipeline reverse-generation of nodes providing for dual, non-conflicting interfaces to create and edit application logic (allowing collaborative development processes between business or domain analysts and modelers or data scientists); (4) an alerting process in the event pipeline and notebook representations of application logic are erroneously allowed to go out of synchronization (providing strong checks and balances); (5) provides artificial intelligence (AI) and model governance and auditability automatically, without manual or additional effort.

—Software Module Embodiments—

Software instructions may be designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, the present system (such as system 100) includes a computing/data processing system including a computing application or collection of distributed computing applications (such as a notebook interface 305 or pipeline interface 310 to a data integration and modeling service 120) for access and use by other client computing devices associated with an enterprise (such as the client devices 145, 150, 155 and 160 of enterprise network 115). The system and client computing devices communicate with each other over a network (such as network 110). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system implements a centralized server-side application that provides at least one or more of the functions disclosed herein and a graphical user interface to access and operate them, and that is accessed by many users through computing devices/terminals communicating with the present computing system (functioning as the server) over a computer network. In one embodiment, cloud infrastructure system 105 (including data integration and modeling service 120) may be implemented on on-premises infrastructure, such as a set of one or more dedicated servers. In one embodiment the present system provides at least one or more of the functions disclosed herein and a graphical user interface to access and operate the functions.

—Computing Device Embodiment—

FIG. 8 illustrates an example computing device 800 that is configured and/or programmed as a special purpose computing device with one or more of the example systems and methods described herein, and/or equivalents. The example computing device 800 may be a computer 805 that includes at least one hardware processor 810, a memory 815, and input/output ports 820 operably connected by a bus 825. In one example, the computer 805 may include automatic two-way notebook and pipeline generation and synchronization logic 830 configured to facilitate automatic two-way generation and synchronization of notebook and pipeline similar to the logic, systems, methods, and other embodiments shown in and described with reference to FIGS. 1-7.

In different examples, the logic 830 may be implemented in hardware, a non-transitory computer-readable medium 837 with stored instructions, firmware, and/or combinations thereof. While the logic 830 is illustrated as a discrete hardware component attached to the bus 825, it is to be appreciated that in other embodiments, the logic 830 could be implemented in the processor 810, stored in memory 815, or stored in disk 835.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate automatic two-way generation and synchronization of notebook and pipeline. The means may also be implemented as stored computer executable instructions that are presented to computer 805 as data 840 that are temporarily stored in memory 815 and then executed by processor 810.

Logic 830 may also provide means (e.g., hardware, non-transitory computer-readable medium that stores executable instructions, firmware) for performing automatic two-way generation and synchronization of notebook and pipeline.

Generally describing an example configuration of the computer 805, the processor 810 may be a variety of various processors including dual microprocessor and other multiprocessor architectures. A memory 815 may include volatile memory and/or non-volatile memory. Non-volatile memory may include, for example, ROM, PROM, and so on. Volatile memory may include, for example, RAM, SRAM, DRAM, and so on.

A storage disk 835 may be operably connected to the computer 805 via, for example, an input/output (I/O) interface (e.g., card, device) 845 and an input/output port 820 that are controlled by at least an input/output (I/O) controller 847. The disk 835 may be, for example, a magnetic disk drive, a solid state drive (SSD), a floppy disk drive, a tape drive, a Zip drive, a flash memory card, a memory stick, and so on. Furthermore, the disk 835 may be an optical drive, such as a CD-ROM drive, a CD-R drive, a CD-RW drive, a DVD ROM, and so on. The memory 815 can store a process 850 and/or a data 840, for example. The disk 835 and/or the memory 815 can store an operating system that controls and allocates resources of the computer 805.

The computer 805 may interact with, control, and/or be controlled by input/output (I/O) devices via the input/output (I/O) controller 847, the I/O interfaces 845, and the input/output ports 820. Input/output devices may include, for example, one or more displays 870, printers 872 (such as inkjet, laser, or 3D printers), audio output devices 874 (such as speakers or headphones), text input devices 880 (such as keyboards), cursor control devices 882 for pointing and selection inputs (such as mice, trackballs, touch screens, joysticks, pointing sticks, electronic styluses, electronic pen tablets), audio input devices 884 (such as microphones or external audio players), video input devices 886 (such as video and still cameras, or external video players), image scanners 888, video cards (not shown), disks 835, network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network, the computer 805 may be logically connected to remote computers 865. Networks with which the computer 805 may interact include, but are not limited to, a LAN, a WAN, and other networks.

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Acronyms and Initialisms Used Herein Have the Following Meanings:
  API: application programming interface;
  ASIC: application-specific integrated circuit;
  CD: compact disk;
  CD-R: CD recordable;
  CD-RW: CD rewriteable;
  CPU: central processing unit;
  CRUD: create, read, update, delete;
  DRAM: dynamic RAM;
  DVD: digital versatile disk and/or digital video disk;
  GPU: graphics processing unit;
  GUI: graphical user interface;
  HDD: hard disk drive;
  HPC: high-performance computing;
  I/O: input/output;
  IAAS: infrastructure-as-a-service;
  ID: identifier;
  JDBC: Java database connectivity;
  JSON: JavaScript object notation;
  LAN: local area network;
  ML: machine learning;
  MMG: Model Management and Governance;
  NAS: network-attached storage;
  OFSAA: Oracle Financial Services Analytical Applications;
  OS: operating system;
  PAAS: platform-as-a-service;
  PGQL: property graph query language;
  PGX: property graph server;
  PROM: programmable ROM;
  RAM: random access memory;
  REST: representational state transfer;
  ROM: read only memory;
  SAAS: software-as-a-service;
  SOAP: simple object access protocol
  SQL: structured query language;
  SRAM: synchronous RAM;
  SSD: solid-state storage device;
  TCP/IP: Transmission Control Protocol/Internet Protocol
  USB: universal serial bus;
  WAN: wide area network; and
  XML: extensible markup language.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method comprising:
   identifying differences between a pipeline representation of application logic and a notebook representation of the application logic,
   wherein the differences include (i) a notebook paragraph without a corresponding pipeline node and (ii) a pipeline node without a corresponding notebook paragraph,
   wherein the pipeline representation includes a graph data structure that orders execution of application logic with links between pipeline nodes, and
   wherein the pipeline representation of the application logic is shown as a graph of pipeline nodes in a pipeline user interface;
   synchronizing the pipeline representation and notebook representation by,
      for the notebook paragraph that does not have the corresponding pipeline node, determining that the corresponding pipeline node was not deleted through the pipeline user interface, and in response automatically generating a new pipeline node in the pipeline representation, and
      for the pipeline node that does not have the corresponding notebook paragraph, determining that the corresponding notebook paragraph was not deleted through a notebook user interface, and in response automatically generating a new notebook paragraph in the notebook representation; and
   updating the pipeline user interface to show the new pipeline node and updating the notebook user interface to show the new notebook paragraph.

2. The computer-implemented method of claim 1, wherein the generation of a new pipeline node further comprises:
   sorting paragraphs of the notebook based on order of execution;
   identifying (i) a first paragraph immediately preceding the notebook paragraph that does not have a corresponding pipeline node in the order of execution, and (ii) a second paragraph immediately subsequent to the notebook paragraph that does not have a corresponding pipeline node in the order of execution;
   removing a connecting link in the pipeline representation between a first node corresponding to the first paragraph and a second node corresponding to the second paragraph;
   recording a type of the connecting link;
   linking the first node to the new pipeline node with a new link of a default type; and
   linking the new pipeline node to the second node with a new link of the recorded type.

3. The computer-implemented method of claim 1, wherein the generation of a new notebook paragraph further comprises:
   determining a set of paragraphs of the notebook on which execution of the new notebook paragraph depends; and
   inserting the new notebook paragraph into the notebook following the set of paragraphs.

4. The computer-implemented method of claim 1, further comprising repeatedly polling the pipeline and notebook representations in order to synchronize the pipeline and notebook representations in real time.

5. The computer-implemented method of claim 1, wherein the generation of a new pipeline node further comprises:
   analyzing the notebook paragraph that does not have a corresponding pipeline node to identify a type of task performed by the notebook paragraph;
   setting the new pipeline node to be of the type identified; and displaying the new node in the pipeline with an icon associated with the type of task.

6. The computer-implemented method of claim 1, further comprising:
generating an alert message in response to identification of the difference between pipeline and notebook representations of application logic; and
transmitting the alert message for display in at least one of the pipeline user interface and the notebook user interface.

7. The computer-implemented method of claim 1, wherein the notebook paragraph is encapsulated with an application programming interface, further comprising executing the notebook paragraph in response to an application programming interface call from the pipeline interface.

8. The computer-implemented method of claim 1, further comprising:
accessing the notebook paragraph within the pipeline user interface; and
editing the notebook paragraph within the pipeline user interface;
wherein the edits in the pipeline user interface modify the notebook paragraph within the notebook representation.

9. A computing system comprising:
a processor;
a memory operably connected to the processor;
a non-transitory computer-readable medium operably connected to the processor and memory and storing computer-executable instructions that when executed by at least a processor of the computing system cause the computing system to:
identify differences between a pipeline representation of application logic and a notebook representation of the application logic, wherein the pipeline representation includes a graph data structure that orders execution of application logic with links between pipeline nodes of the application logic, and wherein the pipeline representation of the application logic is shown as a graph of pipeline nodes in a pipeline user interface;
determine which of the differences is a notebook paragraph without a corresponding pipeline node and which of the differences is a pipeline node without a corresponding notebook paragraph;
for the notebook paragraph that does not have the corresponding pipeline node, determining that the corresponding pipeline node was not deleted through the pipeline user interface, and in response automatically generating a new pipeline node in the pipeline representation and updating the pipeline user interface to show the new pipeline node; and
for the pipeline node that does not have the corresponding notebook paragraph, determining that the corresponding notebook paragraph was not deleted through a notebook user interface, and in response automatically generating a new notebook paragraph in the notebook representation and updating the notebook user interface to show the new notebook paragraph.

10. The computing system of claim 9, wherein the instructions for generation of a new pipeline node further cause the computing system to:
sort paragraphs of the notebook based on order of execution;
identify (i) a first paragraph immediately preceding the notebook paragraph that does not have a corresponding pipeline node in the order of execution, and (ii) a second paragraph immediately subsequent to the notebook paragraph that does not have a corresponding pipeline node in the order of execution;
remove a connecting link in the pipeline representation between a first node corresponding to the first paragraph and a second node corresponding to the second paragraph;
record a type of the connecting link;
link the first node to the new pipeline node with a new link of a default type; and
link the new pipeline node to the second node with a new link of the recorded type.

11. The computing system of claim 9, wherein the instructions for generation of a new notebook paragraph further cause the computing system to:
determine a set of paragraphs of the notebook on which execution of the new notebook paragraph depends; and
insert the new notebook paragraph into the notebook following the set of paragraphs.

12. The computing system of claim 9, wherein the instructions further cause the computing system to repeatedly poll the pipeline and notebook representations in order to synchronize the pipeline and notebook representations in real time.

13. The computing system of claim 9, wherein the instructions for generation of a new pipeline node further cause the computing system to:
analyze the notebook paragraph that does not have a corresponding pipeline node to identify a type of task performed by the notebook paragraph;
set the new pipeline node to be of the type identified; and
display the new node in the pipeline with an icon associated with the type of task.

14. The computing system of claim 9, wherein the instructions further cause the computing system to:
generate an alert message in response to identification of the difference between pipeline and notebook representations of application logic; and
transmit the alert message for display in at least one of the pipeline user interface and the notebook user interface.

15. The computing system of claim 9, wherein the notebook paragraph is encapsulated with an application programming interface, and wherein the instructions further cause the computing system to execute the notebook paragraph in response to an application programming interface call from the pipeline interface.

16. The computing system of claim 9, wherein the instructions further cause the computing system to:
access the notebook paragraph within the pipeline user interface; and
edit the notebook paragraph within the pipeline user interface;
wherein the edits in the pipeline user interface modify the notebook paragraph within the notebook representation.

17. A computer-implemented method comprising:
comparing pipeline data and notebook data to identify a notebook paragraph that is unregistered as a pipeline node of a pipeline;
determining that the pipeline node was not deleted through a pipeline user interface;
in response to determining that the pipeline node was not deleted through the pipeline user interface, automatically generating a generated pipeline node in the pipeline corresponding to the unregistered notebook paragraph, wherein the pipeline data includes a graph data structure that orders execution of logic of an application with links between pipeline nodes of the logic, and wherein the logic of the application is configured to be displayed as a graph of pipeline nodes in the pipeline user interface;

linking the generated pipeline node into the pipeline;

comparing the pipeline data and the notebook data to identify an additional pipeline node that does not have a corresponding notebook paragraph in a notebook;

determining that the corresponding notebook paragraph was not deleted through a notebook user interface, in response to determining that the corresponding notebook paragraph was not deleted through the notebook user interface, automatically generating a generated notebook paragraph that corresponds to the additional pipeline node; and inserting the generated notebook paragraph into the notebook.

18. The computer-implemented method of claim 17, wherein the linking of the generated pipeline node further comprises:

sorting paragraphs of the notebook based on order of execution;

identifying (i) a first paragraph immediately preceding the unregistered notebook paragraph in the order of execution, and (ii) a second paragraph immediately subsequent to the unregistered notebook paragraph in the order of execution;

remove a connecting link in the pipeline representation between a first node corresponding to the first paragraph and a second node corresponding to the second paragraph;

record a type of the connecting link;

link the first node to the generated pipeline node with a new link of a default type; and link the generated pipeline node to the second node with a new link of the recorded type.

19. The computer-implemented method of claim 18, wherein the order of execution for the paragraphs of the notebook differs from an order of inclusion in which the paragraphs are included in the notebook.

20. The computer-implemented method of claim 17, wherein automatically generating the generated notebook paragraph comprises:

retrieving a template script for nodes of a type selected for the additional pipeline node; and populating the generated notebook paragraph with the template script.

\* \* \* \* \*